No. 822,244. PATENTED JUNE 5, 1906
W. H. BRISTOL.
PRESSURE INDICATOR AND RECORDER.
APPLICATION FILED MAR. 18, 1905.

Witnesses
C. W. Thomas
Geo. W. Eisenman

William H. Bristol Inventor
By His Attorney Fred'k P. Schuetz

UNITED STATES PATENT OFFICE.

WILLIAM H. BRISTOL, OF NEW YORK, N. Y.

PRESSURE INDICATOR AND RECORDER.

No. 822,244.

Specification of Letters Patent.

Patented June 5, 1906.

Application filed March 18, 1905. Serial No. 250,745.

*To all whom it may concern:*

Be it known that I, WILLIAM H. BRISTOL, a citizen of the United States of America, residing at New York, in the county and State of New York, have invented certain new and useful Improvements in Pressure Indicators and Recorders, of which the following is a specification.

My invention relates to improvements in devices for indicating or recording pressures and variations thereof, and particularly to that class of pressure indicating or recording devices in which the elongation or expansion of an expansible chamber is converted into a deflection, serving to indicate the existing pressure, by suitably restraining the movement of said chamber.

My present invention is an improvement on my former invention, patented February 4, 1890, No. 420,570, and has for its object to give greater freedom of motion to increase the proportionate angular motion and to permit of a diversity of scales.

For this purpose my invention consists, essentially, of an expansible chamber which is constrained to a definite direction of motion by one or more hinged restraining connections.

My invention will best be understood when described in connection with the accompanying drawings, in which—

Figure 1:
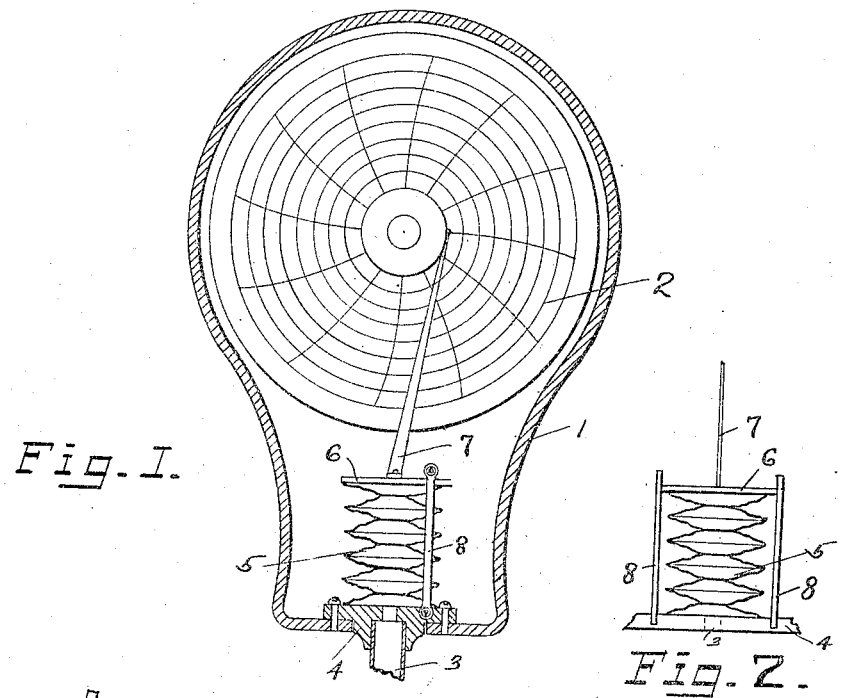
Figure 2:
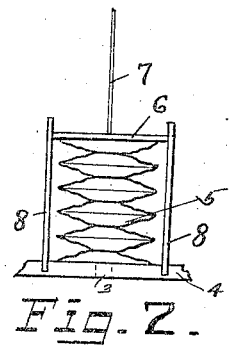
Figure 3:
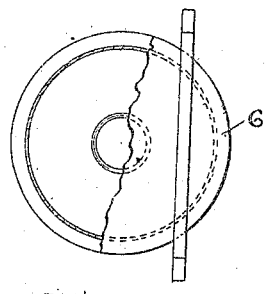

Figure 1 illustrates the application of my invention to a recording device. Fig. 2 is a side view. Fig. 3 is an enlarged cross-sectional view. Figs. 4 to 7 are views showing modifications.

Similar numerals of reference designate corresponding parts throughout the several views.

Referring now to the drawings, 1 is a case of any suitable indicating or recording mechanism provided with a dial 2, upon which a continuous record of the pressure is made.

3 is a connecting-pipe through which the pressure to be measured is brought to the instrument.

4 is a perforated head secured to the pipe 3 and to the case and adapted to form one end of the expansible chamber 5. This expansible chamber 5 is closed at the top and has a non-flexible plate 6, to which is attached the pointer 7. It is composed of a series of sections of perforated diaphragms either plain or corrugated or may consist simply of a single expansible section.

Figure 4:
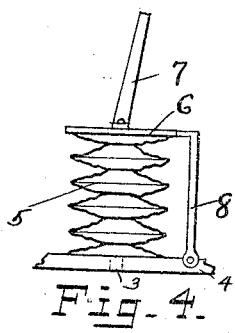
Figure 5:
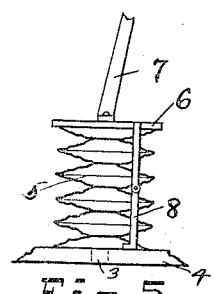
Figure 6:
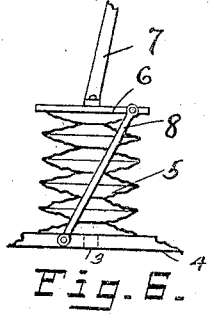

Internal pressure applied to the chamber 5 will cause it to expand. To utilize this expansion for the purpose of measuring the pressure, I restrain the elongation or expansion preferably by two rigid pieces 8, each provided with at least one hinged part, so as to be capable of free rotation in a definite plane. When two pieces are used, I place them on opposite sides of the chamber 5 and so connect them to said chamber that their plane is parallel to the axis of normal expansion of the chamber, as shown in Figs. 1 to 3 and 5 and 7, or inclined to it, as shown in Fig. 6. As shown in Figs. 1 to 3, this hinged connection is in the form of a knife-edge bearing at the top and bottom of the chamber 5. Of course the connection may be rigid at the top and hinged only at the bottom, as shown in Fig. 4. The piece 8 may be composed of one or two parts, and in the latter case both may be rigidly connected to the top and bottom, respectively, and the hinged connection made intermediate, as shown in Fig. 5. The degree of angular motion will depend upon the relative positions of the bearings, and therefore a considerable variation is possible. Further, I am enabled to obtain a great diversity of scales by varying the location of the upper and lower connections—for example, as shown in Fig. 6.

I do not wish to restrict myself to any particular form of "hinged connection" and by this term desire to be understood as meaning any of the well-known forms of bearings, such as pin, knife-edge, pivot, or roller.

Figure 7:
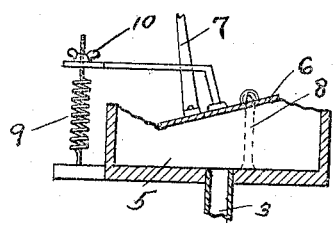

In order to determine the positive zero position of the pointer, I place the chamber under a slight initial tension in adjusting the pieces 8. In case the spring effect of the chamber is not sufficient to produce the necessary initial tension I provide an adjustable spring 9, as shown in Fig. 7, in which a single plate 6 is connected to the rigid sides of the chamber 5 by some flexible material, such as rubber, leather, &c. Unless a spring be provided for this chamber there is no certainty that the pointer will assume a definite zero position, as in the case of the expansible chamber composed of a series of perforated diaphragms, which of themselves act as a spring, nor will it promptly return on decrease in pressure. By making the tension of this spring adjustable, as by the winged nut 10, and making the plate 6 large and the bearings knife-edge bearings I obtain an instrument responsive to the slightest variations of pressure. Also by varying the tension of the spring 9 I am enabled to use the same instrument for different ranges of pressure.

I do not wish to restrict myself to any particular location of the hinged connection nor to any particular form of hinged connection, and what I claim as new, and desire to secure by Letters Patent, is—

1. In a pressure indicator or recorder the combination with an expansible chamber, of hinged restraining means adapted to convert the expansion of said chamber into a deflection of the same.

2. In a pressure indicator or recorder; the combination with an expansible chamber, of hinged restraining means adapted to convert the expansion of said chamber into a deflection of the same, and an indicating-arm attached to said chamber.

3. In a pressure indicator or recorder; the combination with an expansible chamber composed of a series of perforated diaphragms, of hinged restraining means adapted to convert the expansion of said chamber into a deflection of the same.

4. In a pressure indicator or recorder; the combination with an expansible chamber composed of a series of perforated diaphragms, of hinged restraining means adapted to convert the expansion of said chamber into a deflection of the same, and an indicating-arm attached to said chamber.

5. In a pressure indicator or recorder; the combination with an expansible chamber, of two hinged restraining-pieces adapted to convert the expansion of said chamber into a deflection of the same.

6. In a pressure indicator or recorder; the combination with an expansible chamber, of two restraining-pieces connected to said chamber by knife-edge bearings and adapted to convert the expansion of said chamber into a deflection of the same.

7. In a pressure indicator or recorder; the combination with an expansible chamber, of two hinged restraining-pieces adapted to convert the expansion of said chamber into a deflection, the common plane of said pieces being at right angles to the direction of deflection of the same.

In testimony whereof I have signed my name to this specification, in the presence of two subscribing witnesses, this 16th day of March, 1905.

WILLIAM H. BRISTOL.

Witnesses:
A. FABER DU FAUR,
RAENA H. YUDIZK.